Nov. 3, 1931.   B. D. ENLUND   1,829,793

METHOD OF DETERMINING THE TENSILE STRENGTH OF IRON AND STEEL

Original Filed Aug. 16, 1927

INVENTOR.
BROR DAVID ENLUND.
BY Philip S. Hopkins
ATTORNEY

Patented Nov. 3, 1931

1,829,793

UNITED STATES PATENT OFFICE

BROR DAVID ENLUND, OF DEGERFORS, SWEDEN, ASSIGNOR TO HENNING ENLUND, OF BINGHAMTON, NEW YORK

METHOD OF DETERMINING THE TENSILE STRENGTH OF IRON AND STEEL

Original application filed August 16, 1927, Serial No. 213,296. Divided and this application filed March 5, 1929. Serial No. 344,360.

The primary object of my invention is to provide a method of determining the tensile strength of iron and steel, by the use of specific electric resistance measurements of test pieces thereof, and comparing such measurements with known factors.

Another object of my invention is to provide a method of this character whereby the result can be directly determined from a chart without the necessity of making calculations.

A further object of my invention is to provide such a method which is readily adaptable for use both at the furnaces or point of manufacture as well as in the laboratories and places of use. By my invention, the tensile strength of iron and steel may be determined readily and quickly without the necessity of mathematical calculations, thus making it possible to rapidly test the material for this characteristic, and to do so with relatively unskilled labor.

It should be stated at the outset that if in the manufacture of iron or steel varying heat treatments are used, the specific electric resistance of the material will necessarily vary with said treatments. It is also well known that variations in the amount of a foreign substance in iron or steel, such as carbon, results in a variation of the tensile strength thereof. I have found that there is a direct relation between the specific electric resistance of iron and steel and the tensile strength thereof governed by the foreign substances therein and the treatment of the iron and steel in the making. Therefore, if the grade of iron and steel, as to foreign substance and treatments, be expressed by an empirical factor, there is obviously a direct relation between this factor and the specific electric resistance of the material, from which can be determined the tensile strength thereof.

Suitable charts have been prepared by means of which readings may be made by direct comparison between the known factor of a given material and the specific electric resistance measurement. These charts have been prepared with a view to eliminate all necessity of calculations in order that accurate readings may be made by an unskilled party or one not familiar with the mathematical calculations necessary to determine the tensile strength of a given material. This application is a division of my former application Serial No. 213,296 filed August 16, 1927 now Patent No. 1,718,687.

Reference should now be had to the figures of the accompanying drawings forming a part of this application and wherein like reference numerals indicate like parts.

In the drawings:—

Figure 1:
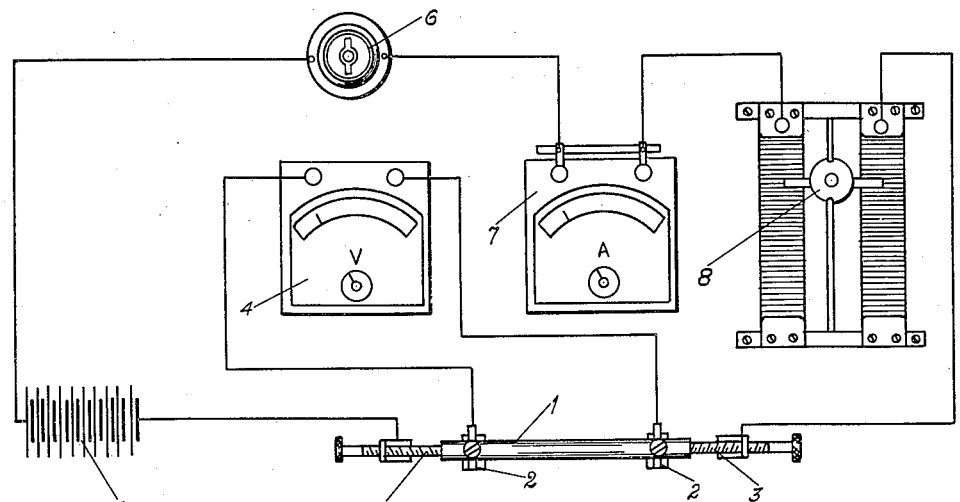
Figure 1 is a diagrammatic view illustrating a form of apparatus for measuring the specific electric resistance of the material to be tested.

It should be here stated that the particular apparatus which is shown in the drawings is illustrative only of a type applicable for measuring the specific electric resistance of the material to be tested. This apparatus forms no part of my invention herein described and claimed, and many forms of apparatus may be substituted for that shown. In fact, any suitable specific electric resistance measuring apparatus may be employed in carrying out my invention. Likewise, the specific type of chart illustrated is representative only as other forms of charts or scales could be substituted therefor without departing from the spirit and scope of my invention.

In carrying out my invention and method for determining the tensile strength of for instance steel, a length of steel of a given grade and having for instance a known factor of 2.5, representing the foreign substance content and the treatment to which the steel has been subjected, is taken of a suitable cross section, limited only by the size of the apparatus used for making the measurements.

This test bar, indicated by the reference character 1. is hardened and placed in suitable clamps 2 where it is supported for engagement at either end by contact members 3 engageable with such ends. The clamps 2 also comprise contact members and are included in the circuit with the voltmeter 4. The contact members 3 lie in a circuit which includes a source of current such as a battery 5, a switch 6, an ammeter 7 and one or more rheostats 8. With the test bar now supported in the clamps 2, and the contacts 3 engaging the ends thereof, the switch 5 is closed allowing the current from the battery 5 to pass through the test bar and register upon the voltmeter and ammeter, readings from which the specific electric resistance of the test bar in micro-ohms can be readily computed. As before stated, if desired, an apparatus containing instruments upon which may be read directly the specific electric resistance in micro-ohms may be used.

Figure 2:
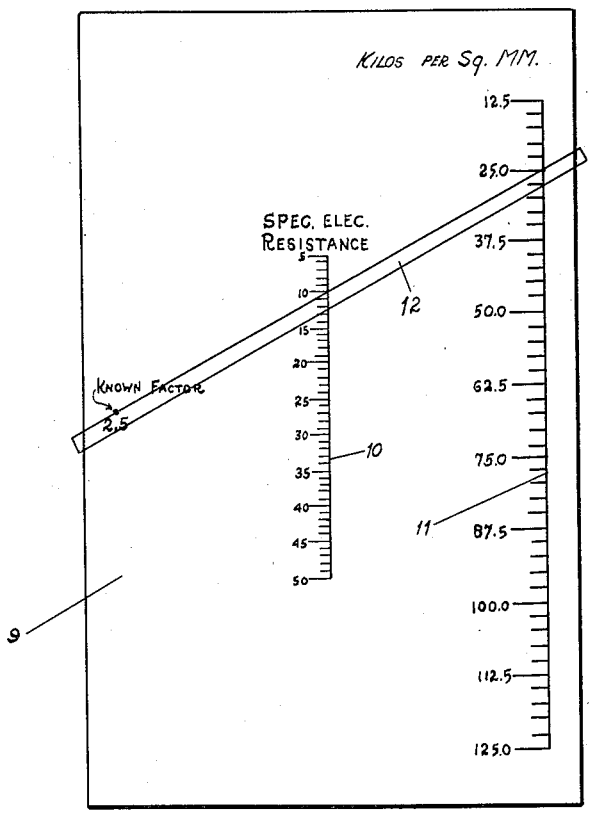
Figure 2 is a plan view of a chart used in connection with the resistance measuring apparatus and upon which the tensile strength of the material to be tested can be read.

With reference now to Figure 2, of the drawings, I have indicated a chart 9 for use in determining the tensile strength of annealed or normalized steel having a known factor of 2.5, representing the treatment and foreign substance content. A central scale is provided on the chart calibrated in units of specific electric resistance, reading from top to bottom, and to the left of this scale and suitably located with respect thereto is a point representing the factor 2.5. This central scale is indicated at 10. On the opposite side or to the right of the scale 10 is a scale 11 calibrated in this instance in "kilos per square millimeter" representing the units of tensile strength to be measured. If, therefore, after measuring the specific electric resistance of the test bar of the grade of steel for which this chart is prepared, in the above described manner, the specific electric resistance is noted on scale 10 and a straight edge 12 is laid across such scale between that point and the factor point 2.5 to the left of the scale, the tensile strength of the steel may be read at the opposite end of the straight edge on the scale 11. Therefore, by comparison between the specific electric resistance of a known grade and character of steel, with a common factor expressing such grade and character, the tensile strength thereof is determined.

Obviously, many changes may be made by way of detail in the form and method of use of my invention without departing from the spirit and scope thereof. I do not limit myself, therefore, to the forms shown and described herein other than by the appended claims.

I claim:—

1. The method of determining the tensile strength of iron and steel comprising the steps of measuring the specific electric resistance of a piece of material to be tested and comparing such measurement with a known factor representative of the grade and treatment of said material.

2. The method of determining the tensile strength of iron and steel comprising the steps of measuring the specific electric resistance of a piece of the material to be tested, and multiplying such measurement by a known factor determined by the treatment of said material, on a chart upon which can be directly read the tensile strength.

In testimony whereof, I affix my signature.

BROR DAVID ENLUND.